(No Model.)
E. P. KOONTZ.
IMPLEMENT FOR EXTERMINATING RODENTS.
No. 382,708. Patented May 15, 1888.
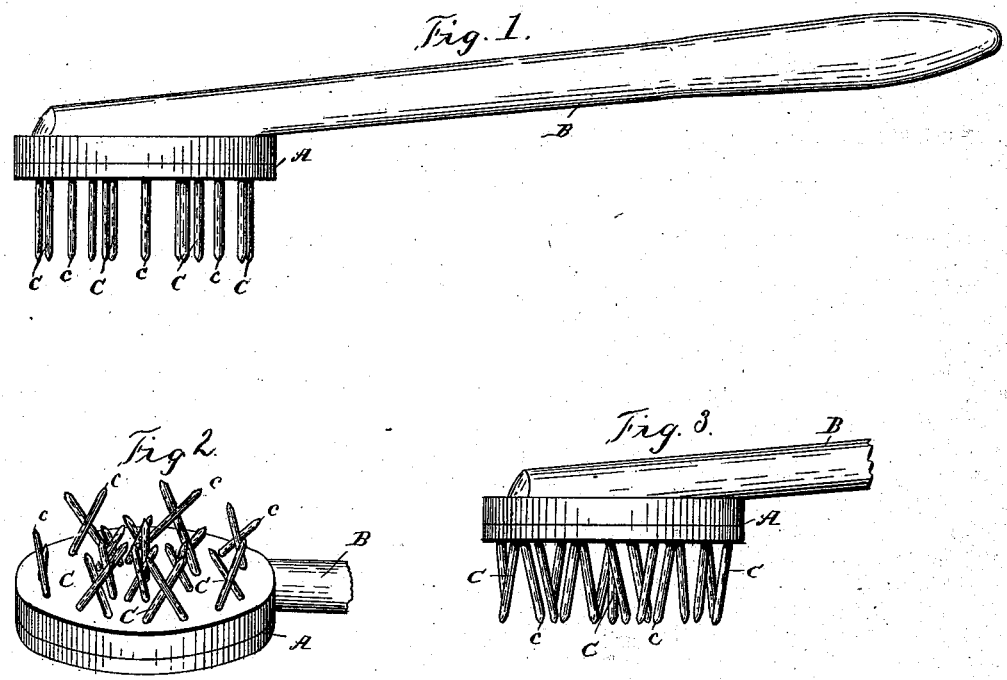
Witnesses,
Edwin L. Bradford.
Charles J. Stockman.
Ezra P. Koontz,
Inventor.
By his Attorney in fact
Chas. E. Barbur

UNITED STATES PATENT OFFICE.

EZRA P. KOONTZ, OF LIGONIER, INDIANA.

IMPLEMENT FOR EXTERMINATING RODENTS.

SPECIFICATION forming part of Letters Patent No. 382,708, dated May 15, 1888.

Application filed October 11, 1887. Serial No. 252,048. (No model.)

*To all whom it may concern:*

Be it known that I, EZRA P. KOONTZ, a resident of the United States, residing at Ligonier, in the county of Noble and State of Indiana, have invented certain new and useful Improvements in Devices for Exterminating Moles, &c., of which the following is so full, clear, and exact a description as will enable others skilled in the art to which my invention appertains to make and use the same.

This invention relates to an improvement in devices for exterminating moles and other ground-burrowing animals; and it consists in certain novel features of construction, whereby a simple and inexpensive device is provided which will be capable of uncovering and killing such animals as moles, harvest-mice, and others which burrow but a slight distance beneath the surface of the earth, all of which will be hereinafter described, and particularly pointed out in the claim at the end of the specification.

In the accompanying drawings, illustrating my invention, and in which similar letters of reference denote corresponding parts, Figure 1 is a side plan of my improved device for exterminating moles, &c.; and Figs. 2 and 3 are similar views, showing slight modifications in the arrangement of the teeth.

The head of my improved device is designated by the reference-letter A, and is provided with a handle, B. Obviously, this head may be formed of any suitable size, shape, or material, and I do not wish it to be understood as limiting myself to any particular form, size, or material, but reserve to myself the right to construct it in any manner to suit the trade for which it is designed without departing from the general spirit of my invention or in any manner interfering with its usefulness. The under surface of this head A is provided with a series of downwardly-projecting teeth, C, secured thereto in any suitable manner, and constructed of steel, iron, or other suitable rigid or inflexible material, and preferably formed with sharpened extremities, c, as shown. These teeth are suitably arranged on the under surface of the head A in such a manner as to secure the best results; but it has been found from experience that arranging them substantially in the form of circles of decreasing size, situated one within the other, as shown, will secure satisfactory results. These teeth C are arranged in pairs in the head A in an inclined position in such a manner that each will cross or lap the other. It will be quite obvious that there may be any number of these teeth used and that they may be formed of any suitable size without departing from the general spirit of my invention.

From the foregoing it will be observed that the manner of using my device is as follows: It is a well-known fact that moles, harvest-mice, &c., burrow in the ground and have their runs but a slight distance beneath the top, and it is also a well-known fact that the earth is thrown up in the form of a ridge, commonly known as "mole-hills," wherever these runs exist. Thus the vicinity of the animal will be apparent. It is my practice to follow up and uncover these runs with my device, and whenever an animal is found to destroy him by the device.

It will thus be obvious that this device is extremely simple in its construction and inexpensive in its cost of manufacture, while at the same time it will be much more efficient in killing moles than the old form of spring-trap.

I do not wish to be understood as limiting myself to its application as an animal-exterminator, as it has been found from experience that it can be used as a hoe or as a pulverizer for the earth with satisfactory results.

Having now described the construction, operation, and advantages of my device, what I believe to be new, and desire to secure by Letters Patent, and what I therefore claim, is—

The herein-described implement for exterminating rodents, consisting of the handle B, having secured at one end the head A, said head being provided with inflexible sharpened teeth c, arranged in pairs thereon, and each pair being crossed or lapped together, as shown and described.

In testimony whereof I affix my signature in the presence of two witnesses.

EZRA P. KOONTZ.

Witnesses:
JONAS SHOPE,
JOHN KANE.